United States Patent Office 3,681,223
Patented Aug. 1, 1972

3,681,223
ELECTROPHORETIC DEPOSITION OF COLOR PHOSPHORS
James A. Gupton, Jr., Raleigh, N.C., assignor to Corning Glass Works, Corning, N.Y.
Filed July 27, 1970, Ser. No. 58,547
Int. Cl. B01k 5/02
U.S. Cl. 204—181
9 Claims

ABSTRACT OF THE DISCLOSURE

Color phosphors are electrophoretically deposited on a cathode ray tube faceplate. First, a plurality of conductive dot patterns are deposited on the faceplate, one pattern for each color of phosphor dots to be deposited. Each pattern includes lands of material on which the dots are to be deposited and conductive paths interconnecting the lands. The conductive pattern is deposited with a single masking operation. The different color phosphors are then successively deposited on the dots by electrophoresis, one color phosphor being deposited on each conductive pattern.

BACKGROUND OF THE INVENTION

This invention relates to the deposition of luminescent material on a transparent substrate and more particularly to the electrophoretic deposition of color phosphor dots on faceplates of cathode ray tubes.

In the current commercial industrial method of producing color cathode ray tubes, each color phosphor of the faceplate is individually deposited by a settling process. The color phosphor, that is to say a phosphor producing a particular color of light under electronic bombardments, is dried, sprayed with an ultraviolet setting compound, and exposed to ultraviolet light through a mask to set the individual dots for that color. Then, excess phosphor is flushed away and the faceplate is redried. Another pattern of phosphor dots for producing another color is deposited in the same manner. When all three phosphors have been deposited the screen is relacquered, aluminized and baked.

The foregoing method is time-consuming because of the large number of steps required. Also, it requires obtaining exact registration between three separate masking operations which are required to lay down the three dot patterns. Also, this deposition technique results in undercutting of dot walls during the removal of excess phosphor.

Although electrophoretic processes for the deposition of luminescent material on transparent substrates are known, e.g. the process described in U.S. Pat. No. 2,851,408—Cerulli, the processes have not had extensive commercial use for the reasons set forth in my copending application S.N. 1,302, filed May 14, 1970. These same reasons have precluded the use of these electrophoretic deposition processes for color phosphors in color cathode ray tube faceplates.

SUMMARY OF THE INVENTION

In accordance with the present invention a considerable savings in fabrication time is obtained and a high uniformity of phosphor deposit thickness is obtained by electrophoretically depositing color phosphors on cathode ray tube faceplates. In carrying out the present invention three patterns of conductive material are simultaneously deposited on the faceplate of the cathode ray tube. Each pattern includes lands of conductive material on which the dots are to be deposited with conductive paths interconnecting the lands of each pattern. One color phosphor is electrophoretically deposited on one of the patterns by connecting a voltage source to that pattern and immersing the tube in a slurry containing the color phosphor. Then, the voltage source is applied to another conductive pattern and the faceplate is reimmersed in another slurry containing a different color phosphor. All three color dots are deposited in a manner which provides considerable time savings by elimination of settling time in phosphor deposition, drying time between deposits of phosphor for the light masking operations and drying after the excess phosphor flush-off.

In the present commercial fabrication method, the walls of the dots are undercut during phosphor removal. Because of this undercutting, there is not as much phosphor within the dot in relation to exposed surface area as would otherwise be obtained without undercutting. On the other hand, during the electrophoretic deposition of the present invention, phopshor deposits tend to grow perpendicular to the edge of the conductive pattern. This is caused by a phenomenon which is commonly referred to as "edge effect." This preferential growth of phosphor at the edges of the conductive pattern produces a relatively thick rim wall surrounding the dot area. Because of this, there is increased phosphor contained within the dot and this produces a greater light emission than comparable sized dots produced by the present commercial method. The "edge effect" phenomenon associated with electrophoretic deposition provides another advantage. The edge effect produces walls on each side of the conductive path interconnecting the dots. Because of the limited area of phosphor in contact with the faceplate, these walls can easily be flushed away with deionized water. In this manner all trace of interconnecting lines is effectively removed leaving the desired pattern of phosphor dots on the tube faceplate.

In accordance with another aspect of the present invention the dot patterns are applied with a single dot mask. Only a single masking operation is required. This avoids the problem of obtaining exact registration between three separate masking operations.

The foregoing and other objects, features and advantages of the invention will be better understood from the following more detailed description, appended claims, and drawings.

DESCRIPTION OF A PARTICULAR EMBODIMENT

Figure 1:
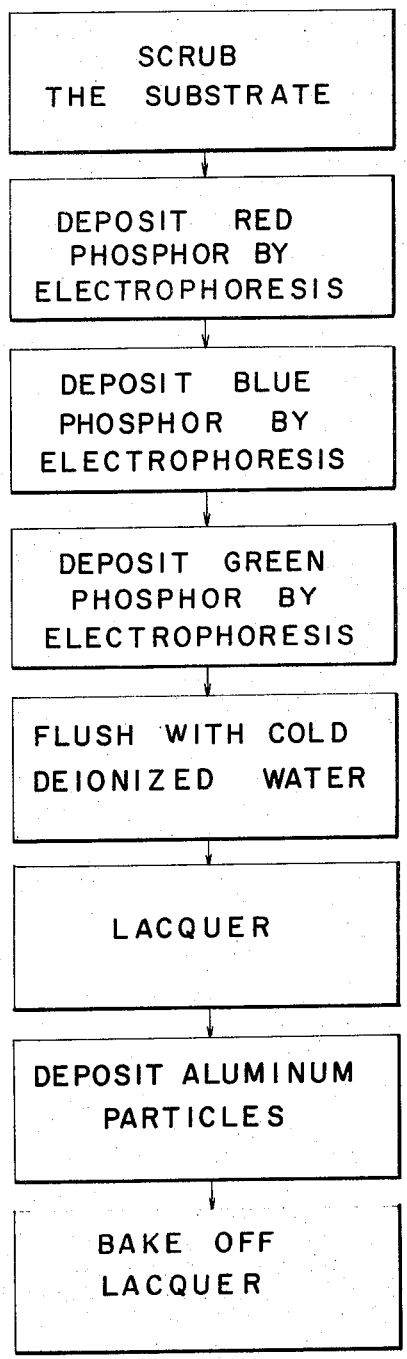
FIG. 1 is a flow diagram of the method of this invention.

Referring to FIG. 1, the first step in the process of the present invention is to clean and decontaminate a substrate such as the faceplate of the cathode ray tube. For example, the substrate may be exposed to a high frequency scrubbing with ions in a glow discharge.

Figure 2:
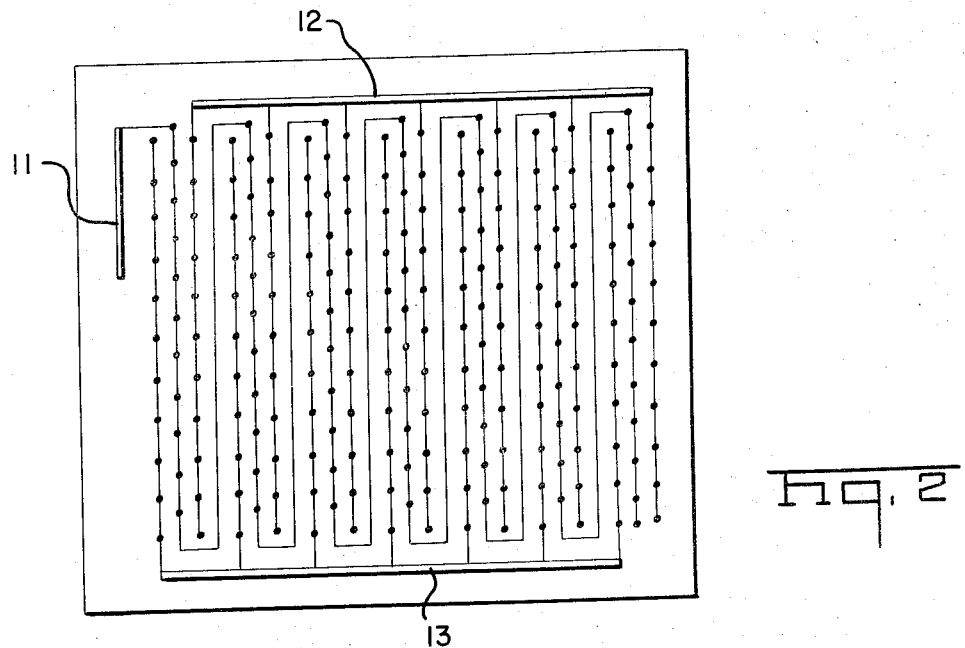
FIG. 2 shows the mask used to apply the conductive patterns.

In the next step, the conductive patterns are deposited on the substrate or faceplate. When a metal such as zinc is used as the conductive material, a single mask such as that hown in FIG. 2 is used for depositing the conductive material on a nucleated substrate.

The mask includes a pattern of red dot perforations which are interconnected by conductive paths and which terminate in the perforation 11 for the red dot electrode. A pattern of blue dot perforations are joined by perforations which will produce the conductive paths interconnecting them. The path perforations terminate in a perforation 12 which will produce the blue dot electrode. Similarly there is a pattern of green dot perforations, perforations connecting the dots, and a perforation 13 which will produce the green dot electrode.

This mask is used to deposit conductive patterns on the tube faceplate. One example of a technique for doing this is to evaporate a deposit of zinc through the mask onto the cathode ray tube faceplate. As will be subsequently described the preferred technique includes light masking an aluminum coating on the faceplate.

As indicated in FIG. 1 the next step of the process is to deposit red phosphor on one of the patterns by electrophoresis. This is accomplished by applying a voltage to the red dot electrode formed on the faceplate and then immersing the tube faceplate in a slurry containing the red phosphor. After the red phosphor dots are deposited in this manner the blue phosphor dots are deposited. All that is necessary is that the electrical connection be switched from the red electrode to the blue electrode and the tube reimmersed in a slurry of blue phosphor. Note that no drying time is required between deposits of different phosphors. The green phosphor dots are deposited on the associated pattern by the same technique.

Where zinc, for example, has been used as the conductive material, it will be necessary to remove the zinc after all of the dots have been deposited. One method of zinc removal is by heating the faceplate to, example, 405° C. in a vacuum of $2 \times 10^{-5}$ torr. The zinc evaporates within 15 minutes and the phosphor remains on the dot areas with great adherence.

In order to remove the phosphor from the paths interconnecting the dots, the faceplate is next flushed with cold deionized water as indicated in the flow chart of FIG. 1. This effectively removes the phosphor from the paths without removing it from the dot areas as a result of the "edge effect" phenomenon.

In the last three steps of the process, the faceplate is aluminized. This is achieved by first applying a lacquer, followed by drying the lacquer and applying small aluminum particles to the lacquer. The lacquer serves as a tent over the irregularities of the phosphor so the aluminum will have a mirror like finish. The aluminum serves as a light reflection shield which provides a better light output. The lacquer is then baked off.

Figure 3:
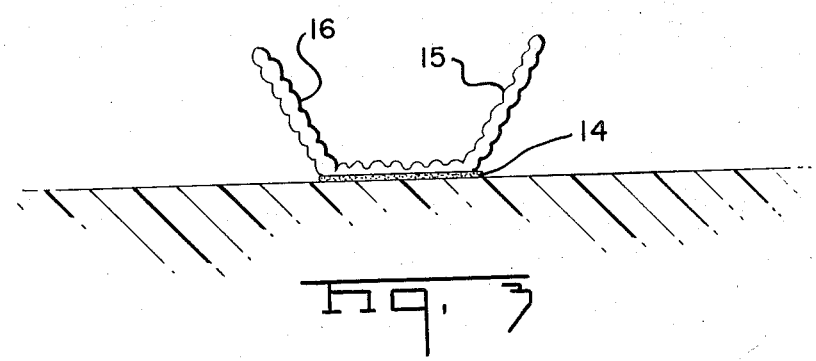
FIG. 3 shows the wall caused by "edge effect" on the conductive paths.

As may be seen by reference to FIG. 3, the predeliction of phosphor growth perpendicular to the edges of the zinc conductor 14 produces the walls 15 and 16 of phosphor. Because there is a very limited area of the phosphor deposit in contact with the faceplate, the phosphor deposit can be easily flushed away.

Figures 4, 5:
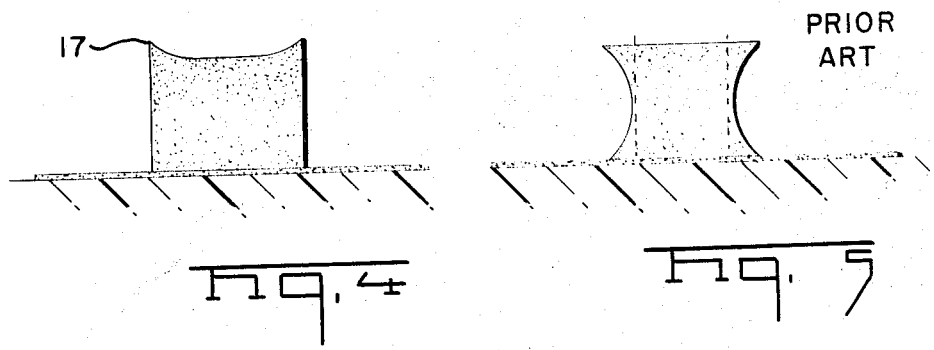
FIG. 4 shows the rim build-up due to "edge effect" on the phosphor dots.
FIG. 5 shows the undercutting of dots when they are laid down by the present commercial method.

Another result of the "edge effect" is shown in FIG. 4 which depicts one of the phosphor dots. (Note that FIG. 4 is not to scale with FIG. 3. The phosphor dots are very much larger in area than the cross-section of the conduction paths.) FIG. 4 shows the rim 17 which is built up around the periphery of the dot by "edge effect." Because of this rim there is a greater quantity of phosphor in the dot for a given surface area. Greater light emission is obtained from increased phosphor volume. Contrast this with the dot produced by the present commercial method as depicted in FIG. 5. During etching there is an undercutting of the dot. Because of this the volume of phosphor contained in the dot is smaller in relation to the exposed surface area. Also dots produced by this method are not as structurally strong as those produced by electrophoretic deposition in accordance with the present invention.

While the evaporation of the conductive pattern through the mask as previously described is acceptable, the optical technique of laying down the conductive pattern is preferred. In accordance with this technique a coating of aluminum is uniformly applied to the cathode ray tube faceplate. This conductive metal is mixed with an agent which hardens the coating when exposed to ultraviolet light. One such agent which is commercially available is sold under the trade name KPR® by the Eastman Kodak Company. Next, a single photographic master, similar in appearance to that shown in FIG. 2, is used to lay down the pattern on the coating. The coating on the faceplate is exposed to ultraviolet radiation through the photographic master. This hardens the coating in the desired pattern. Then, the coating is etched or flushed to remove the unhardened coating around the patterns. Note that only one masking operation is required.

The process of depositing an aluminum film on a TV faceplate is described in my copending application Ser. No. 1,302, filed May 14, 1970. The deposition of an aluminum film in this manner has important advantages. The aluminum film is cleaner and it can be made as thin as 50 to 75 angstroms. The film becomes completely transparent after an air bake at approximately 450° C. which oxidizes the aluminum. The resultant aluminum oxide provides virtually no attenuation of high intensity light. Because of this, the phosphors can be deposited right on the aluminum oxide coating with no need to remove the aluminum oxide after deposition of the phosphor dots.

The following is an example of a preferred technique for carrying out the invention. The parameters given in this example are by way of illustration only and are not intended to be limiting on the invention.

Example (1) Faceplate is cleaned and decontaminated by use of liquid chemical cleaner trichlorothylene and/or "glow" discharge" scrubbing in vacuum.

(2) Deposit thin metallic conductor in vacuum, aluminum 50 A. to 250 A. thick.

(3) Apply photo-resist, negative type Eastman Kodak KPR, by spray technique.

(4) Alignment and exposure of photo-resist by use of master photographic negative, ultraviolet exposure, and development of exposed photo-resist with negative type KPR developer.

(5) Etching faceplate to remove unwanted aluminum with potassium hydroxide etchant being 30% deionized water by weight.

(6) Removal of photo-resist by dissolving with negative type KPR solvent.

(7) Wash in alcohol.

(8) Attach electrode to appropriate cathode terminal for blue dot.

(9) Deposit faceplate into electrolyte containing blue phosphor, and apply appropriate current having approximate current density of $12 \times 10^{-5}$ amperes per cm.² Electrolyte composition is:

| | | |
|---|---|---|
| 490 ml. | Ethyl alcohol | 98% by volume. |
| 10 ml. | Deionized water | 2% by volume. |
| 150 mg. | Thorium nitrate | $10^{-4}$ mole per liter. |
| 500 ml. | Electrolyte | |

(10) Repeat steps 8 and 9 for red and green phosphors.

(11) Bake screen at 400° C. to affix phosphor and to oxidize aluminum using an oxidizing atmosphere.

(12) Flush faceplate in deionized water to remove interconnecting "walls" of phosphor.

(13) Application of aluminizing lacquer by spraying.

(14) Drying lacquer by baking at 70° C.–100° C. for 15 minutes.

(15) Vacuum deposit 200 A. to 3000 A. 99.999 pure particles of aluminum.

(16) Remove lacquer by baking at 150° C. for 15 minutes.

(17) Assemble faceplate to CRT 3 gun assembly.

What is claimed:

1. The method of depositing phosphor dots of different colors on a cathode ray tube faceplate comprising:
   depositing a plurality of conductive patterns on said faceplate, one pattern for each color of phosphor dots to be deposited, each pattern including lands of material on which the dots are to be deposited and conductive paths interconnecting said lands, each pattern being electrically isolated from any other pattern,
   successively depositing the different color phosphors by electrophoresis, one color phosphor being deposited on each conductive pattern, and
   removing the phosphor deposited by edge effect on said conductive paths to produce a cathode ray tube faceplate having different color phosphor dots deposited thereon.

2. The method recited in claim 1 wherein the step of removing comprises:
   flushing said faceplate with cold deionized water to remove the phosphor deposited by edge effect on the conductive paths.

3. The method recited in claim 1 wherein the step of removing comprises:
   evaporating said conductive patterns after deposition of the color phosphors.

4. The method recited in claim 1 wherein said step of successively depositing the different color phosphors comprises:
   applying a voltage to one conductive pattern,
   immersing said faceplate in a slurry of one color phosphor to electrophoretically deposit that color phosphor on the conductive pattern to which the voltage is applied, and
   repeating the steps of applying a voltage and immersing said faceplate with the voltage applied to other conductive patterns and the slurry containing other color phosphors.

5. The method recited in claim 1 wherein said step of depositing a plurality of conductive patterns comprises:
   applying conductive patterns to said faceplate with a single mask having a plurality of dot perforations.

6. The method recited in claim 5 wherein said step of depositing conductive patterns comprises:
   evaporating a conductive metal through said mask onto said faceplate.

7. The method recited in claim 6 wherein said conductive metal is zinc.

8. The method recited in claim 5 wherein said step of applying conductive patterns comprises:
   coating said faceplate with a conductive metal mixed with an agent which hardens the coating when exposed to light,
   applying light through said dot mask to harden said coating in a conductive pattern, and
   flushing said faceplate to remove the unhardened coating.

9. The method recited in claim 8 wherein said conductive metal is aluminum.

References Cited

UNITED STATES PATENTS 3,360,450   12/1967   Hays _____ 204—181

FOREIGN PATENTS 634,702   3/1950   Great Britain _____ 204—181

HOWARD S. WILLIAMS, Primary Examiner